Nov. 22, 1966     M. B. PRICE     3,286,315
FASTENING DEVICE
Filed Nov. 4, 1964
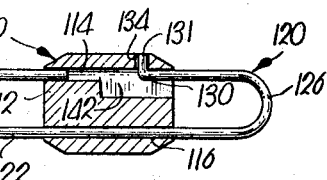
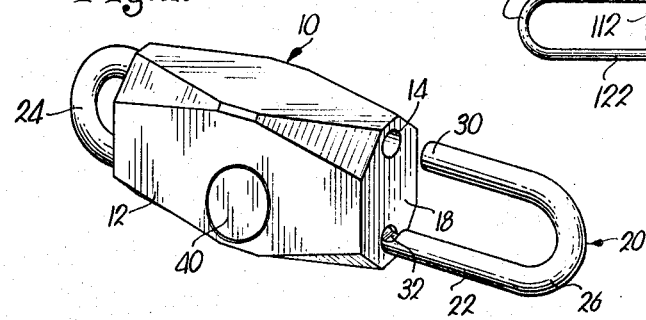
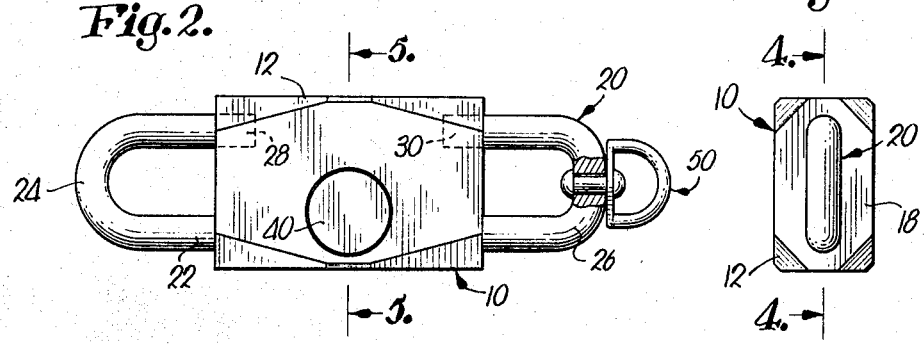
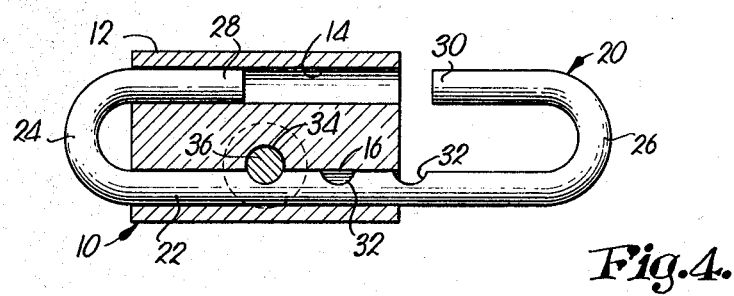
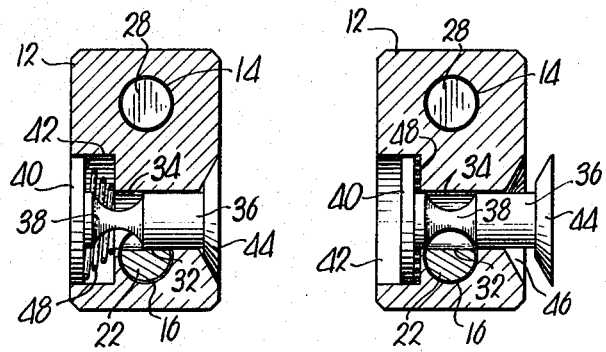
INVENTOR.
Montague B. Price
BY
Hovey, Schmidt, Johnson & Hovey,
ATTORNEYS.

United States Patent Office 3,286,315
Patented Nov. 22, 1966

3,286,315
FASTENING DEVICE
Montague B. Price, 2607 E. 6th, Topeka, Kans.
Filed Nov. 4, 1964, Ser. No. 408,868
3 Claims. (Cl. 24—73)

This invention relates to fastening devices and, more particularly, to a device having a pair of normally closed loops and manually operable for selectively opening either loop to permit the fastening of two items together.

Although a wide variety of snaps, locks and the like have heretofore been utilized for joining two items together, such as a leash to a dog collar, these devices have generally either been unreliable in that they were subject to becoming unlatched or, if positive locking, were difficult to operate. It is, therefore, the primary object of this invention to provide a fastening device which is simple and easy to operate, yet which is positive locking and not subject to inadvertent opening.

Another important object of this invention is to provide such a device which is of rugged construction and not subject to breakage under normal usage.

A still further important object of this invention is to provide a fastener having highly reliable characteristics but which may be easily and economically fabricated from commonly available materials by the use of readily available machine tools.

Another very important object of the instant invention is to provide a fastening device which is highly versatile and equally sutiable for construction on a small scale from relatively light materials where weight is an important consideration and on a larger scale from heavier materials where strength is a primary consideration.

These and other important objects of the instant invention will be explained or become apparent from the following specification and appended claims.

In the drawing:
FIGURE 1 is a front perspective view of a fastening device embodying the principles of this invention;
FIG. 2 is a side elevational view of a device similar to that shown in FIG. 1 but having a swivel on one hook of the shackle, parts being broken away and shown in cross section to reveal details of construction;
FIG. 3 is an end elevational view of the device of FIG. 1;
FIG. 4 is a vertical, cross-sectional view taken along line 4—4 of FIG. 3;
FIG. 5 is a vertical, cross-sectional view taken along line 5—5 of FIG. 2, showing the latch in its normal position;
FIG. 6 is a view similar to FIG. 5 showing the latch in the open position thereof; and
FIG. 7 is a vertical, cross-sectional view of a modified form of fastening device.

A fastener embodying the principles of this invention is broadly designated 10 in the drawing and includes an enlongated body 12 of rigid material. Body 12 is provided with a pair of spaced, parallel, longitudinally extending bores 14 and 16 therethrough, with the bores 14 and 16 opening upon opposed end surfaces 18 of body 12.

A shackle 20 for fastener 10 comprises an elongated, transversely circular member 22 complementally received in bore 16 in sliding relationship therewith. Member 22 is bent upon itself as shown in the drawing to provide a pair of hooks 24 and 26 at opposite ends of body 12. The points 28 and 30 of hooks 24 and 26 respectively, are axially aligned with one another and are aligned with bore 14 in body 12 so that the points 28 and 30 may be telescoped into bore 14 when member 22 is shifted in bore 16, as will be understood.

Member 22 is provided with a series of notches 32 shown best in FIG. 4, there being a notch 32 located midway between each end of shackle 20. A chamber 34 extends transversely through body 12 perpendicular to bore 16 and in communication with the latter. An elongated, cylindrical element 36 is complementally received within the transversely circular chamber 34 for shifting longitudinally thereof, and element 36 has an annular, transversely arcuate groove 38 proximal one end of element 36 shown clearly in FIGS. 5 and 6.

A pressure plate in the form of a disc 40 is complementally received in a cylindrical enlargement 42 of chamber 34 and is rigidly secured to the end of element 36 proximal groove 38, while a beveled disc 44 is complementally received in a recess 46 in body 12 adjacent the opposite end chamber 34 from enlargement 42. It will be noted in FIGS. 5 and 6 that enlargement 42 is substantially deeper than the transverse width of disc 40 so that element 36 may be shifted laterally with respect to body 12.

A helical spring 48 in enlargement 42 normally biases disc 40 into the position of element 36 shown in FIG. 5 with disc 40 disposed substantially flush with the outer proximal surface of body 12 and with disc 44 seated in recess 46. In this position, element 36 extends into registration with a notch 32 in member 22 and element 36 serves to lock shackle 20 against shifting movement with respect to body 12. By simply pressing on disc 40, however, element 36 be be shifted laterally to the position thereof shown in FIG. 6 wherein groove 38 is brought into registration with bore 16 so that member 22 is free to slide in bore 16. This permits shifting of shackle 20 relative to body 12.

Referring now to FIG. 2, it may be seen that when shackle 20 is shifted to an intermediate position thereof with element 36 received in the middle notch 32, the points 28 and 30 of hooks 24 and 26 respectively, both extend into bore 14 so that hooks 24 and 26 and end surfaces 18 of body 12 define closed loops at either end of fastener 10. As shown in FIG. 4, shackle 20 can be manually shifted to one end of its path of travel wherein point 28 of hook 24 extends further into bore 14 and point 30 of hook 26 is moved into spaced relationship from the proximal end surface 18 of body 12 to provide an opening between hook 20 and body 12 to permit the insertion of an item to be fastened by fastener 10. It is to be pointed out that hook 24 is configured to provide a loop between member 22 and the end of body 12 even when shackle 20 is in this extreme position so that an item such as the link of a chain or the like, could be retained on hook 24 while another item such as a link of another section of chain is being hooked upon hook 26.

It will be readily understood that shackle 20 can be shifted to the opposite extereme end of its path of travel merely upon the lateral shifting of element 36 to unlatch member 22. This, of course, would close hook 26 and open hook 24. The notches 32 in member 22 are conveniently positioned for locking shackle 20 in either extreme position with respect to body 12 and also in the intermediate position thereof with both points 28 and 30 received within bore 14 as illustrated in FIG. 2.

It is contemplated that fastener 10 will find particular utility in serving as a fastener adapted to secure a leash to a dog collar or the like. Hence, provision is made for swivel means broadly designated 50 on shackle 20 to eliminate possible twisting of the leash during use of fastener 10. Manifestly, swivel 50 could be used in innumerable applications of fastener 10. Although only one swivel 50 has been shown in the embodiment of fastener 10 illustrated in FIG. 2, it is contemplated that one or more swivels might be used.

Referring now to FIG. 7, another form of fastening device is broadly designated 110. This device comprises a rigid body 112 having a pair of bores 114 and 116 extending longitudinally therethrough with an elongated member 122 received in bore 116. Member 122 is bent upon itself to provide a shackle 120 comprised of a hook 124 projecting outwardly from one end of body 112 and a hook 126 projecting from the other end of body 112.

Point 130 of hook 126 is provided with an upwardly extending projection 131 which is received in a chamber 134 for locking shackle 120 against shifting with respect to body 112. Bore 114 has an enlargement 142 at one end thereof to accommodate movement of point 130 toward bore 116 to withdraw projection 131 from chamber 134. Manifestly, member 122 is constructed from relatively resilient material such as spring steel or the like, so that manual squeezing of hook 126 deforms the latter sufficiently to withdraw projection 131 from chamber 134. While projection 131 is withdrawn, shackle 120 may be shifted to open either hook 124 or 126 as desired.

Having thus described the invention, what is claimed as new and desired to be secured by Letters Patent is:

1. A releasable fastener comprising:

an elongated body of rigid material having a pair of end surfaces, a pair of opposite side surfaces and a pair of spaced, parallel, longitudinally extending bores through the body, each bore opening on each of said end surfaces, said body having a cylindrical chamber extending transversely through the body perpendicular to one of the bores and communicating therewith, said chamber including a cylindrical enlarged portion adjacent one end thereof and opening on one side surface of said body, said portion being concentric with the remainder of the chamber and of greater diameter than the latter, the inner end of said enlarged portion presenting an annular shoulder on the body in circumscribing relationship to said remainder of the chamber, the other end of said remainder portion including a bevelled recess communicating with the opposite side surface of the body and extending inwardly toward said enlarged portion, said recess presenting an outwardly flared, bevelled seat on the body disposed in circumscribing relationship to said chamber;

a shackle comprising an elongated member received in said one bore and protruding outwardly beyond said end surfaces, each protruding end of said member being bent into a hook with the point of the hook axially aligned with the other of said bores, the member being manually shiftable in said one bore longitudinally thereof for selectively moving the point of a hook into spaced relationship outwardly from a proximal end surface with the point of the other hook extending into said other bore, there being an intermediate position of the member with the points of both hooks extending into said other bore to define closed loops at each end of the body bounded by said hooks and corresponding proximal end surfaces; and a latch for releasably holding the member in said intermediate position, said latch including an elongated, transversely circular element shiftably mounted in the chamber for reciprocable movement longitudinally thereof, said element having a circumferentially extending groove proximal one end of the element, there being a notch in the member adjacent the element in registry with the chamber when the member is in said intermediate position, a circular pressure plate secured to one end of the element adjacent said one side surface of the body and disposed in the enlarged portion of the chamber, said plate being of lesser thickness than the axial depth of said enlarged portion within said body to permit shifting of the plate toward said shoulder, a disc secured to the element adjacent said opposite side surface of the body, said disc having an inner, annular, bevelled edge normally in complemental engagement with said bevelled seat for holding said element in a position with the groove out of alignment with said notch in the member, and a tapered coil spring in said enlarged portion between the plate and the shoulder normally biasing the element toward a position thereof with the element complementally received in the notch for blocking the member against movement from said intermediate position, the element being manually shiftable in the chamber responsive to pressure on said plate for movement to a position of the element with the groove in registry with said one bore to permit longitudinal shifting of the member in the bore.

2. A fastener as set forth in claim 1 wherein at least one of said hooks is provided with a swivel secured thereto.

3. A fastener as set forth in claim 1 wherein said side surfaces are parallel, the outer surface of said disc and said pressure plate lying in the plane of said side surfaces when said bevelled edge of the disc is engaged against said bevelled seat.

References Cited by the Examiner
UNITED STATES PATENTS

| | | | |
|---|---|---|---|
| 1,452,393 | 4/1923 | Shek | 70—38 |
| 1,925,816 | 9/1933 | Oster | 24—238 |
| 2,220,148 | 11/1940 | Eber | 70—25 |

WILLIAM FELDMAN, *Primary Examiner.*

E. SIMONSEN, *Assistant Examiner.*